June 5, 1923.
I. H. ERB
1,457,827
HEAD TOPPING ENSILAGE HARVESTER
Filed March 24, 1921
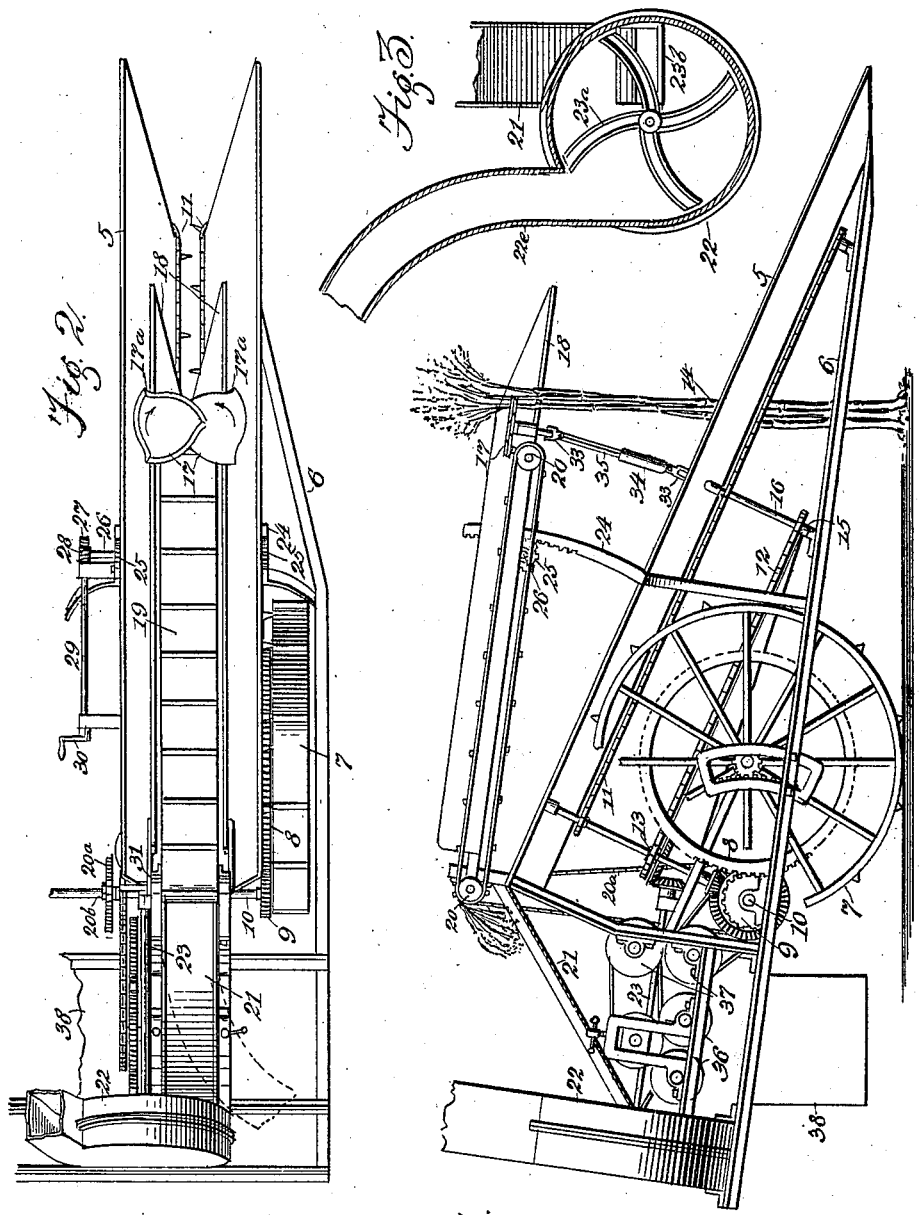

Patented June 5, 1923.

1,457,827

UNITED STATES PATENT OFFICE.

IRWIN H. ERB, OF LAKE MILLS, IOWA, ASSIGNOR OF THREE-FOURTHS TO CLAUDE C. HOBSON, OF RYAN, IOWA, AND OTA O. HOBSON, OF VINTON, IOWA.

HEAD-TOPPING ENSILAGE HARVESTER.

Application filed March 24, 1921. Serial No. 455,005.

*To all whom it may concern:*

Be it known that I, IRWIN H. ERB, a citizen of the United States, residing at Lake Mills, in the county of Winnebago and State of Iowa, have invented certain new and useful Improvements in Head-Topping Ensilage Harvesters; and I do hereby declare the following to be a full, clear, and exact description of the invention, such as will enable others skilled in the art to which it appertains to make and use the same.

This invention relates to the harvesting of ensilage, more particularly such as is produced by sorghum, and the object of the invention is to provide for a practically simultaneous cutting of the stalks from the hills and the severing of their seed-heads, so that in the disposition of the materials the stalks may be treated separately from the seeds.

The invention comprehends, with the usual stalk-severing mechanism, a cutter for the heads, separate conveyors for the stalks and heads, and mechanism for subjecting the stalks to special treatment. This, in the case of sorghum, comprises a set of crushing rolls adapted to express the juice, and a receiving tank therefor, and is more fully set forth and claimed in a separate application, No. 455,006 filed March 24, 1921, to which reference may be had.

In the accompanying drawing, forming a part of this specification, Fig. 1 is a side elevation of an ensilage harvester embodying my invention, partly in section, the better to show the top-cutting and conveying mechanism. Fig. 2 is a partial plan view of such harvester, showing said top-cutting and conveying mechanism. Fig. 3 is a sectional view of a combined chopper and blower used to discharge the harvested material.

In its main characteristics the harvester is of a familiar type, having the usual gathering-boards 5 connecting with a main frame 6 carried by wheels, one of which, the main traction and driving wheel, 7, is herein shown. To this is connected a spur-gear 8 engaging a pinion 9 on a shaft 10. This shaft, by means of gearing which need not be particularly described, drives the gathering chains 11 and 12, the lower of which is made to travel faster than the other, by means of an enlarged sprocket 13, and thereby the stalks 14, when severed, are drawn backwardly more rapidly at the butt ends, so as to approach the feed-rolls in an approximately horizontal position. Near the forward loop of the lower gathering-chain is located the cutting apparatus for severing the stalks from the hill, but this, being of familiar construction is not herein illustrated. The forward sprocket 15, however, connects with a shaft 16 to revolve the cutters 17 for cutting off the seed-heads. These cutters, which are in the nature of rotary shears, with blades somewhat hooked at 17$^a$, revolve in opposite directions, as indicated by the arrows, and sever the heads from the stalks in the forward movement of the machine. The heads are gathered by gathering-boards 18 to a point of convergence between the cutters. Thence the heads fall on a conveyor apron 19 carried by rolls 20 driven by chain 20$^a$ from a sprocket 20$^b$, and are conveyed to near the rear of the machine, dropping over the rear end of the conveyor onto a chute 21 communicating with the blower 22 at the rear end of the machine. This blower is suitably driven by a shaft 23 and gearing connecting it operably with the main traction wheel. To the arms of the blower are attached cutting blades 23$^a$ which co-operate with a fixed blade 23$^b$, and thus chop into short pieces the stalks passing over the fixed blade. The chopped material is blown out of a curved discharge pipe 22$^c$, and falls into the body of a wagon, not shown, traveling alongside the harvester. As the height of the stalks will vary under different conditions, the head-cutters must be shifted up or down accordingly. This may be done in a simple manner by means of rack-bars 24 alongside the gathering boards, and engaging pinions 25 on a shaft 26. The means for turning the shaft may be a worm-gear 27, worm 28, and shaft 29 provided with a crank 30, the conveyor and cutting mechanism being pivotally mounted at the rear end. This shift in the position of the conveyor of course necessitates a flexible connection of the shaft 16 with the shearing cutters. This is effected by the use of universal joints 33, and variations in the length of the shaft are made by the use of a tubular section 34 and a telescoping section 35, here shown as a piece of square shafting.

The cane-topping mechanism above described is here shown in connection with apparatus for crushing the stalks and expressing the juice before they are delivered to the chopper and blower. This mechanism is particularly set forth in the application above referred to, and consists essentially of a set of crushing rolls 36 mounted on the main frame between the feed-rolls 37 and the chopper. Below the crushing rolls is hung a tank 38 to receive the expressed juice. The juice being used for syrup, it is of course necessary to separate the seed-heads from the stalks before the latter are crushed. It is to be understood, however, that such a separation of the seed from the stalks may be desirable whether the stalks are crushed or not, and they need not necessarily be mixed with the chopped stalks and pass into the silage, but may be diverted therefrom, as indicated by a curved chute shown in dotted outline in Fig. 2. The crushing rolls are located below the inclined seed-delivery chute, and are actuated concurrently with the feed-rolls by suitable gearing connecting them with the main tractor-wheel.

Having thus described my invention, I claim:

1. In a cane harvester having cutting mechanism to sever the talks from the hills, means to convey the stalks backwardly, and means adapted to express the juice, a topper, comprising elevated cutters, actuating mechanism therefor, and conveying means to carry the seed-heads away in a course different from that of the stalks.

2. In a cane harvester having cutting mechanism to sever the stalks from the hills, feed mechanism to convey them backwardly, and crushing mechanism adapted to express the juice, a topper, comprising elevated cutters, conveying mechanism to carry the heads over the stalk-feeding and crushing mechanism, and means adapted to discharge the seed-heads and cut silage.

3. In a cane harvester having cutting mechanism adapted for severing the stalks from the hills, and feed-mechanism, crushing rolls, a receiver for the expressed juice, and a chopper and discharging apparatus, a topper, comprising elevated cutters, a conveyor to carry the heads backwardly, and a chute to deliver them over the crushing rolls to the discharging apparatus.

In testimony whereof I affix my signature in presence of two witnesses.

IRWIN H. ERB.

Witnesses:
ARCHIE R. NELSON,
EDWARD BRATTRUD.